United States Patent [19]
Lundström

[11] 4,266,749
[45] May 12, 1981

[54] DRILL BOOM ARRANGEMENT

[75] Inventor: Axel L. Lundström, Hägersten, Sweden

[73] Assignee: Atlas Copco Aktiebolag, Nacka, Sweden

[21] Appl. No.: 28,712

[22] Filed: Apr. 10, 1979

[30] Foreign Application Priority Data

Apr. 11, 1978 [SE] Sweden ........................ 7804053

[51] Int. Cl.³ ........................ F16M 13/00

[52] U.S. Cl. ........................ 248/652; 91/520; 173/38; 182/2

[58] Field of Search ........................ 248/654, 666, 647, 652, 248/653, 651; 173/38, 43, 42, 28; 182/2; 414/687, 694; 91/420, 520

[56] References Cited

U.S. PATENT DOCUMENTS

| | | | |
|---|---|---|---|
| 2,791,399 | 5/1957 | Curtis et al. | 173/43 X |
| 2,993,685 | 7/1961 | Russell | 173/43 X |
| 3,462,103 | 8/1969 | Strom | 182/2 X |
| 3,481,409 | 12/1969 | Westerlund | 173/43 |
| 3,550,506 | 12/1970 | Gardenhour | 91/526 |
| 3,705,631 | 12/1972 | Seaberg | 9/526 X |
| 3,788,425 | 1/1974 | Balogh | 182/2 X |
| 3,978,998 | 9/1976 | Klitz | 414/687 |
| 4,089,388 | 5/1978 | Johnson | 182/2 |
| 4,113,123 | 9/1978 | Jeffrey | 414/687 X |
| 4,171,054 | 10/1979 | Tanaka | 414/687 |

*Primary Examiner*—J. Franklin Foss
*Attorney, Agent, or Firm*—Frishauf, Holtz, Goodman & Woodward

[57] ABSTRACT

A drill boom arrangement comprises a boom proper that is universally pivotably carried by a boom support. The boom carries a feed beam for a rock drill. The boom is swingable on the support by means of two hydraulic cylinders forming a tripod and the feed beam is swingable on the boom by means of two hydraulic cylinders forming another tripod. One of the boom swinging cylinders (17) is coupled in series with one of the feed beam swinging cylinders (28) and these two cylinders are actuated by means of a common direction control valve (58). The boom swinging cylinder (17) can be short-circuited so that the feed beam can be swung upon actuation of the direction control valve (58) while the boom is arrested. The other boom swinging cylinder (16) is coupled in series with the other feed beam swinging cylinder (29) to a common direction control valve (57) in the same way. A joy-stick (59) is coupled to the two direction control valves (57, 58) through pilot valves and pilot lines (64–67).

10 Claims, 8 Drawing Figures

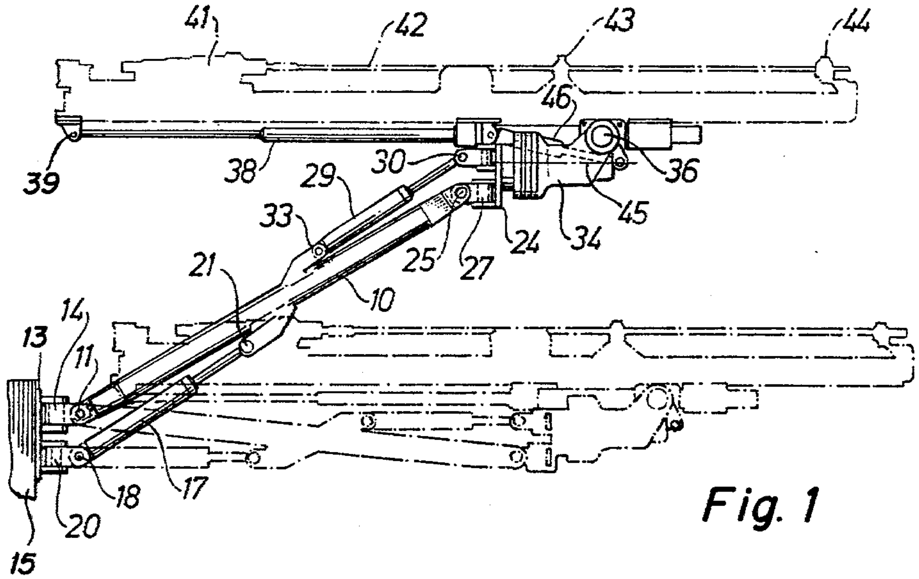
Fig. 1
Fig. 2
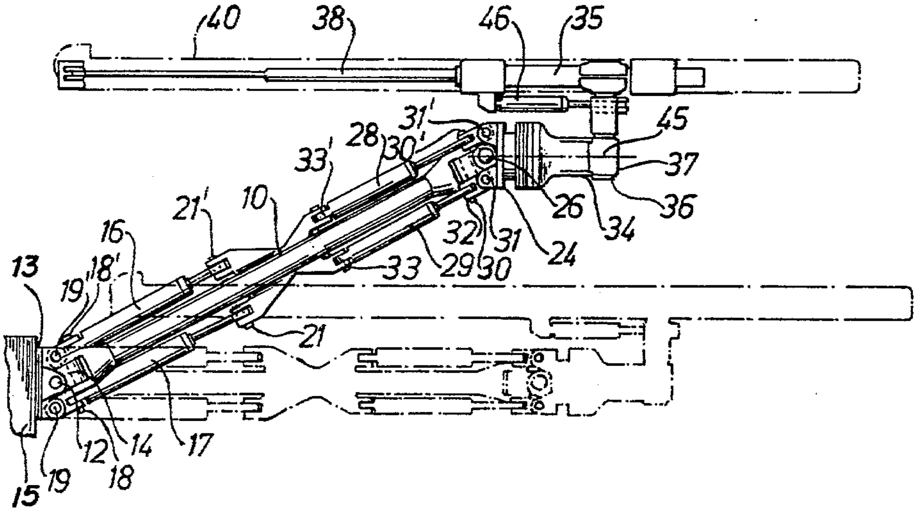

DRILL BOOM ARRANGEMENT

This invention relates to a hydraulic drill boom arrangement for positioning a feed beam for a rock drill to different drilling positions with respect to a boom support. The boom is pivotable on its support by means of one or two hydraulic cylinders and the feed beam is pivotable on the boom by means of one or two hydraulic cylinders. Usually in prior art arrangements of this kind, there are as many direction control valves as cylinders which makes the system expensive.

It is an object of the invention to provide a simple hydraulic system which is also very reliable and makes it easy for the operator to position the feed beam into desired drilling positions.

The above and other purposes of the invention will become obvious from the following description and from the accompanying drawings in which one embodiment of the invention is illustrated by way of example. It should be understood that this embodiment is only illustrative of the invention and that various modifications thereof may be made within the scope of the accompanying claims.

In the drawings,

FIG. 1 shows a side view of a boom in two alternative positions in which the invention is applied.

FIG. 2 is a top view of the boom in FIG. 1 in two alternative positions.

Figure 3:
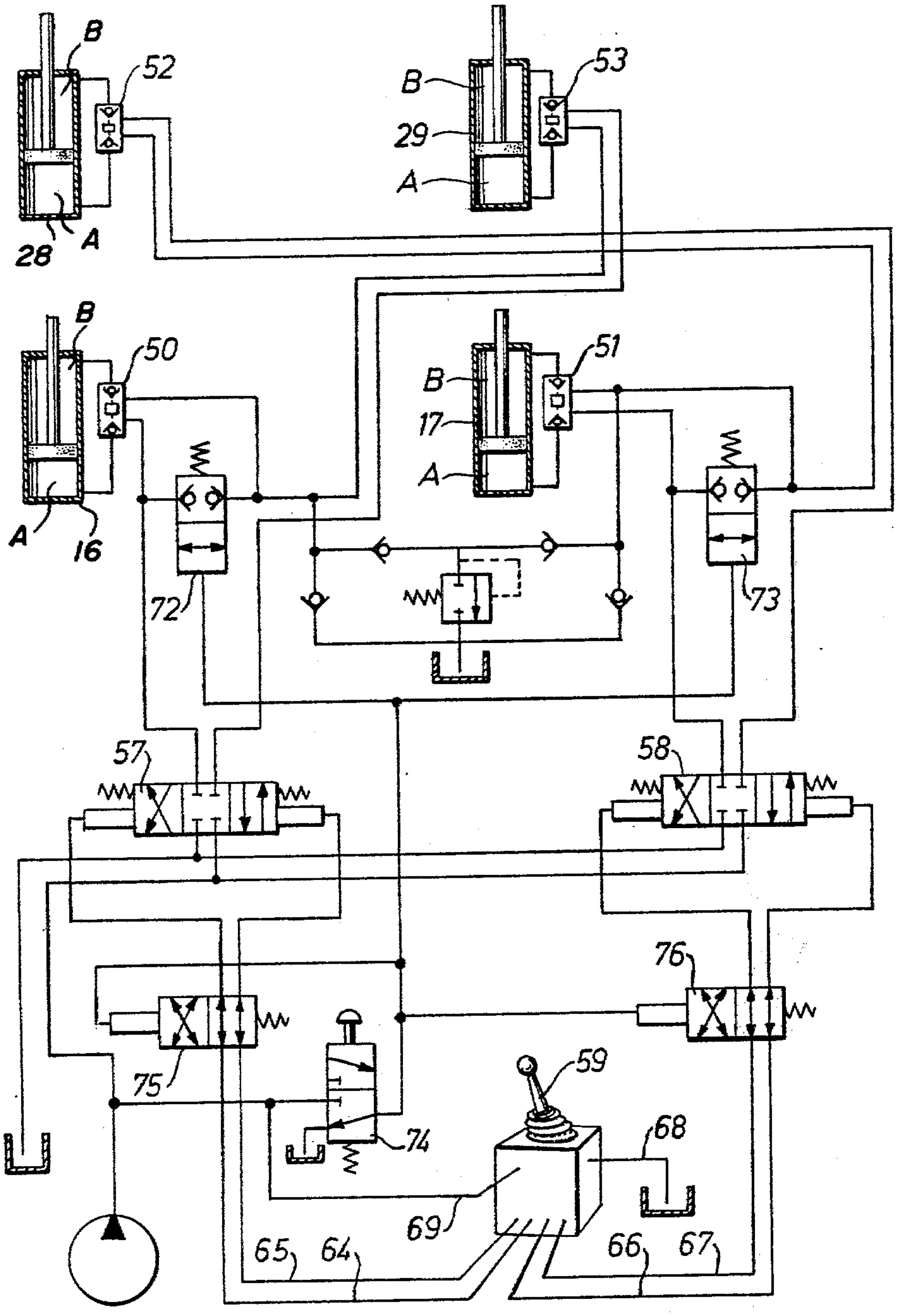
FIG. 3 shows a hydraulic circuitry for parallel displacement and operating of the boom in FIGS. 1 and 2.

In FIGS. 1 and 2 a boom 10 is pivotally supported on a horizontal cross shaft 11 and a vertical cross shaft 12 which are carried by a boom support or bracket 13. The horizontal cross shaft 11 is journalled in a link 14 which is swingable together with the boom 10 about the vertical cross shaft 12. The boom support 13 is carried by an element 15 which forms part of a drill wagon or rig, not shown, on which several booms 10 can be mounted in a group.

The boom is swingable about the cross shafts 11, 12 by means of hydraulic lift and swing cylinders 16, 17. The cylinder 17 is pivotable about a horizontal cross shaft 18 and a vertical cross shaft 19 which are carried by the boom support 13. The horizontal cross shaft 18 is journalled in a link 20 which is swingable together with the cylinder 17 about the vertical cross shaft 19. The end of the piston rod of the cylinder 17 is pivotally connected to the boom 10 by means of a universal joint 21, which comprises a ball on a shaft. The cylinder 16 is connected to the boom support 13 and the boom 10 in the same manner as the cylinder 17. The cross shafts associated with the cylinder 16 are designated 18$^{1}$, 19$^{1}$, 21$^{1}$. The cylinders 16, 17 are of equal size and have the same mounting geometry relative to the boom support 13 and the boom 10.

Due to the fact that the boom support 13 carries the cylinder 17 for swinging about the vertical shaft 19 which is laterally spaced from the vertical swinging plane of the boom 10 a variation in length of solely the cylinder 17 will cause the boom 10 to swing about both the vertical shaft 12 and the horizontal shaft 11.

An extension or contraction of the cylinders 16, 17 of equal amount causes the boom 10 to swing only about the horizontal cross shaft 11. An extension of the cylinder 17 and a contraction of the cylinder 16 of equal amount or vice versa causes the boom 10 to swing about only the vertical cross shaft 12. By differently varying the lengths of the cylinders 16, 17 the boom 10 will simultaneously swing about both cross shafts 11, 12.

In the illustrated embodiment the length of the boom 10 is fixed. The invention may, however, be applied also in extension booms, for instance of the type disclosed in U.S. Pat. No. 3,923,276.

The boom 10 carries a boom head 24. The boom head 24 is pivotally supported by the boom on a horizontal shaft 25 and a vertical shaft 26. The horizontal shaft 25 is journalled in a link 27 which is swingable together with the boom 10 about the vertical shaft 26.

The boom head 24 is swingable about the cross shafts 25, 26 by means of hydraulic tilt and swing cylinders 28, 29. The end of the piston rod of the cylinder 29 is swingable about a horizontal cross shaft 30 and a vertical cross shaft 31 which are carried by the boom head 24. The horizontal cross shaft 30 is journalled in a link 32 which is swingable together with the cylinder 29 about the vertical cross shaft 31. The cylinder 29 is pivotally connected to the boom 10 by means of a universal joint 33, such as a ball joint. The cylinder 28 is connected to the boom head 24 and the boom 10 in the same manner as the cylinder 29. The cross shafts associated with the cylinder 28 are designated 30$^{1}$, 31$^{1}$, 33$^{1}$. The cylinders 28, 29 are of equal size and have the same mounting geometry relative to the boom head 24 and the boom 10.

Due to the fact that the vertical swinging axis of the cylinder 29 is laterally spaced from the vertical swinging plane of the boom head 24 a variation in length of solely the cylinder 29 will cause the boom head 24 to swing about both the vertical shaft 26 and the horizontal shaft 25.

An extension or contraction of the cylinders 28, 29 of equal amount causes the boom head 24 to swing only about the horizontal cross shaft 25. An extension of the cylinder 29 and a contraction of the cylinder 28 of equal amount or vice versa causes the boom head 24 to swing only about the vertical cross shaft 26. By differently varying the lengths of the cylinders 28, 29 the boom head 24 will simultaneously swing about both cross shafts 25, 26.

The boom head 24 carries a turning device 34. The turning device 34 can be of the type disclosed in U.S. Pat. No. 3,563,321. Since the construction of the turning device is not essential to the invention it is not described in detail.

A feed beam holder 35 is pivotally journalled in a casing 37 by means of a cross shaft 36. The casing 37 is coupled to the propeller shaft of the turning device 34. The feed beam holder 35 carries an elongated rock drilling apparatus which includes a feed beam 40 that supports a rock drill 41. The feed beam includes hydraulic power means for displacing the drill along the feed beam in a conventional manner. The rock drill 41 rotates a drill steel 42 and delivers longitudinal impacts on the drill steel. The drill steel 42 is guided by means of drill steel centralizers 43, 44. A hydraulic feed extension cylinder 38 for displacing the feed beam 40 is fixed to the feed beam holder 35 and it is also fixed to a bracket 39 which in its turn is fixed in the feed beam 40. The feed beam 40 is supported slidably in the longitudinal direction thereof on the feed beam holder 35 by means of guides fixed thereon. By extension or contraction of the feed extension cylinder 38 the feed beam 40 can be adjusted longitudinally with respect to the boom 10.

Figure 4:
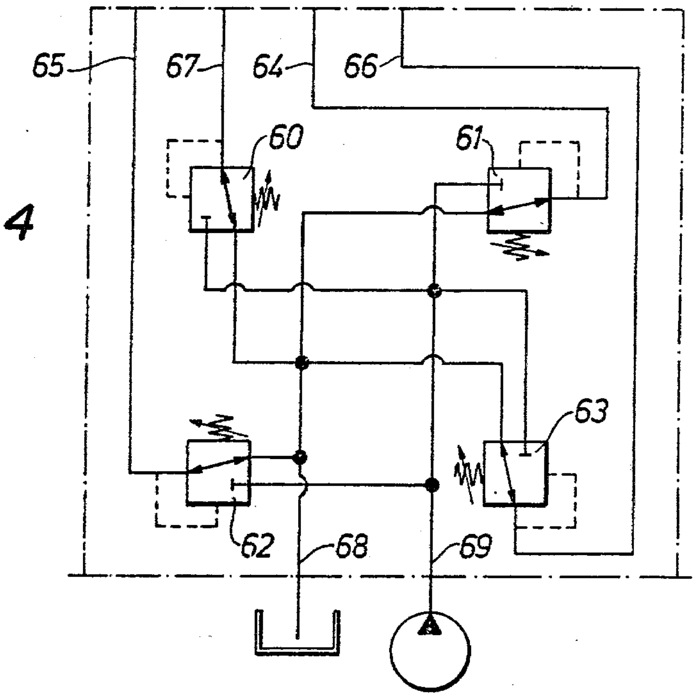
FIG. 4 shows the fundamental construction of a manually one-handedly controlled operating lever according to the invention for actuation of control valves associated with the hydraulic cylinder means.
Figure 5:
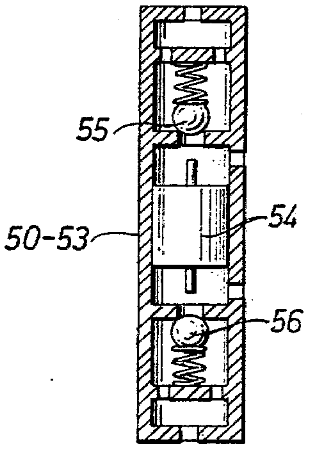
FIG. 5 shows the fundamental construction of hydraulic locks included in the hydraulic circuitry in FIG. 3.

By actuating the turning device 34 the feed beam 40 can be rotated 360° about an axis 45. The feed beam 40 can be swung by means of a hydraulic cylinder 46 about the cross shaft 36 to a position substantially perpendicular to the axis 45. The hydraulic circuitry for controlling the cylinders 16, 17, 28, 29 is illustrated in FIGS. 3–5. It provides for parallel displacement of the feed beam 40 during positioning of the boom, i.e. the swinging movement of the feed beam 40 on the boom 10 is opposite to the swinging movement of the boom on the boom support 13.

As is evident from the circuitry in FIG. 3 each of the cylinders 16, 17, 28, 29 is provided with a hydraulic lock 50, 51, 52, and 53 respectively. The hydrauic locks are of conventional type, e.g. pilot operated double check valves provided with a reversing piston 54 which cooperates with a couple of check valves 55, 56 as is evident from FIG. 5. Through the hydraulic locks 50 and 53 the smaller cylinder chamber B of the cylinder 16 is connected to the larger cylinder chamber A of the cylinder 29. Through the hydraulic locks 51 and 52 the smaller cylinder chamber B of the cylinder 17 is connected to the larger cylinder chamber A of the cylinder 28. Through the connection between the chambers A and B the cylinder 16 becomes one-sidedly hydraulically bound to the cylinder 29 and the cylinder 17 one-sidedly hydraulically bound to the cylinder 28.

A common direction control valve 57 is coupled to the larger cylinder chamber A of the cylinder 16 and to the larger A and smaller B cylinder chambers of the cylinder 29 in order to control the cylinders 16, 29. A common direction control valve 58 is coupled to the larger cylinder chamber A of the cylinder 17 and to the larger and smaller cylinder chambers A and B respectively of the cylinder 28. Thus, the cylinders 17 and 28 are coupled in series to the direction control valve 58 and the cylinders 16 and 29 are coupled in series to the direction control valve 57.

The direction control valves 57, 58 are actuated by means of a manually one-hand controlled operating means 59. The operating means 59 is a lever of coordinate-type known per se (Joy-stick). Four normally closed pressure reducing pilot valves 60, 61, 62, 63 can be steplessly variably adjusted between a closed and a fully open position by means of the lever 59. The function is diagrammatically illustrated in FIGS. 4 and 6. When the pilot valves 60–63 are in a closed position the signal conduits 64–67 of the control valves 57, 58 are connected to tank through a conduit 68. The valves 60–63 are adjusted proportionally to the deflection of the lever 59 by means of a rod 70 and spring means 71. It is possible to either adjust only one of the valves 60–63 by means of the lever 59, or adjust two adjacent valves simultaneously, i.e. any of the valve-couples 62, 63; 63, 61; 61, 60 and 60, 62. Hydraulic fluid is supplied to the signal conduits 64–67 through a supply conduit 69.

Suppose that the common control valve 57 in FIG. 3 is moved to the right from its neutral position. Then, the chamber A of the cylinder 16 is pressurized. The reversing piston 54 opens the opposite check valve 55 of the hydraulic lock 50, thereby connecting chamber B of the cylinder 16 with the chamber A of the cylinder 29. Because of this, a one-sided connection arises between the cylinders 16, 29 which is utilized to parallel-displace the feed beam 40 for instance to the position shown in FIGS. 1 and 2 by dash and dot lines from the initial position shown by unbroken lines. During the one-sidedly bound movement, the chamber B of the cylinder 29 is contracted since it is open to low pressure via the check valve 55 of the hydraulic lock 53 and the control valve 57.

When the control valve 57 is moved to the left in FIG. 3 the chamber B of the cylinder 29 is pressurized. The cylinder 29 then forces fluid from its chamber A to the chamber B in the cylinder 16. The cylinder 16 is then contracted since its chamber A is open to low pressure via the check valve 56 of the hydraulic lock 50 and the direction control valve 57.

The cylinders 17, 28 are extended and contracted by means of the direction control valve 58 in the same manner.

The requirements which must be met in order to obtain an exact parallel displacement of the feed beam 40 during swinging of the boom 10 are that a triangle $T_1$ having its corners on the horizontal swinging axes 11, 18, 21 and 11, 18$^1$, 21$^1$, respectively, is similar to a triangle $T_2$ having its corners on the horizontal swinging axes respectively 25, 30$^1$, 33$^1$ and 25, 30, 33, and that a triangle $T_3$ having its corners on the vertical swinging axes 12, 19, 21 and 12, 19$^1$, 21$^1$, respectively, is similar to a triangle $T_4$ having its corners on the vertical swinging axes respectively 26, 31$^1$, 33$^1$ and 26, 31, 33. If the hydraulic fluid in the chambers B of the cylinders 16, 17 is transferred directly and unchanged to the chambers A of the cylinders 28, 29, then the ratio of the annular piston area in the chambers B of the cylinders 16, 17 to the piston area in the chambers A of the cylinders 28, 29 must be equal with the similarity ratios $T_2:T_1$ and $T_4:T_3$.

Specifically, all the cylinders 16, 17, 28, 29 can be of equal size. The triangles $T_1$ and $T_3$ are then congruent with the triangles $T_2$ and $T_4$, respectively. Due to the fact that the chambers A and B are of different size it is necessary to include a compensation device in the circuitries for parallel displacement. This compensation device has to accumulate or deliver surplus fluid dependent on whether the cylinders are contracted or extended.

According to the invention it is possible to simultaneously swing the boom 10 laterally and vertically by means of the lever 59. It is also possible to simultaneously swing the boom head 24 laterally and vertically by means of the lever 59 without swinging the boom 10. Due to this the feed beam 40 can be rapidly adjusted into a desired drilling position by means of a single operating means.

Figure 6:
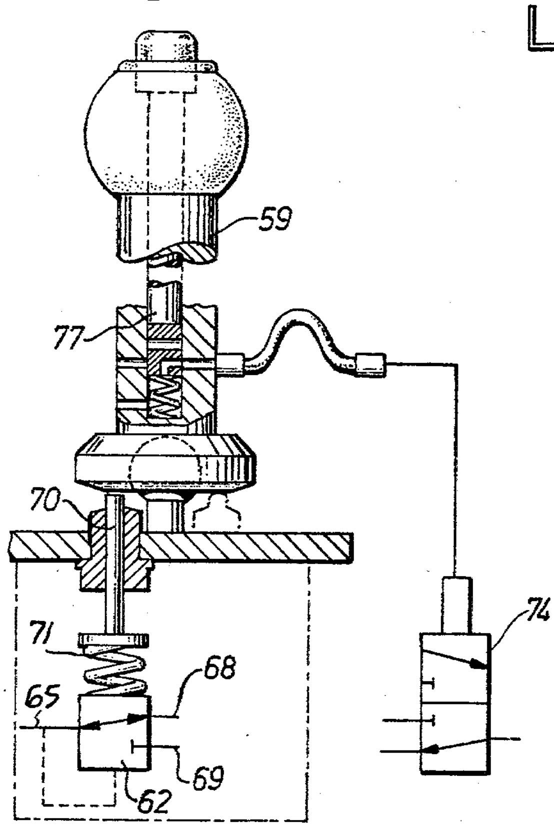
FIG. 6 shows partly in section diagrammatically the one-handedly controlled operating lever.

During swinging of solely the feed beam 40 the two chambers A and B of the cylinders 16, 17 are short-circuited by means of valves 72, 73. The valves 72, 73 are shifted by means of a pilot valve 74. In order to simplify the actuation of the valve 74, it can either be built-in in the operating lever 59 or be remotely controlled by means of another valve 77 which is built-in in the lever 59, as illustrated in FIG. 6. Means are also provided to ensure that, when the pilot valves 60–63 are actuated, the feed beam 40 is swung in the same direction by means of the cylinders 28, 29 when the cylinders 16, 17 are short-circuited as the boom 10 is swung by means of the cylinders 16, 17. This is effected by means of valves 75, 76 which cross-connect the two pilot lines 64, 65 and the two pilot lines 66, 67 respectively and thus reverse the action of the direction control valves 57, 58 when the valve 74 is actuated. As can be seen in FIG. 3 the valve 74 actuates the valves 72, 73 and the valves 75, 76 simultaneously.

Figure 7:
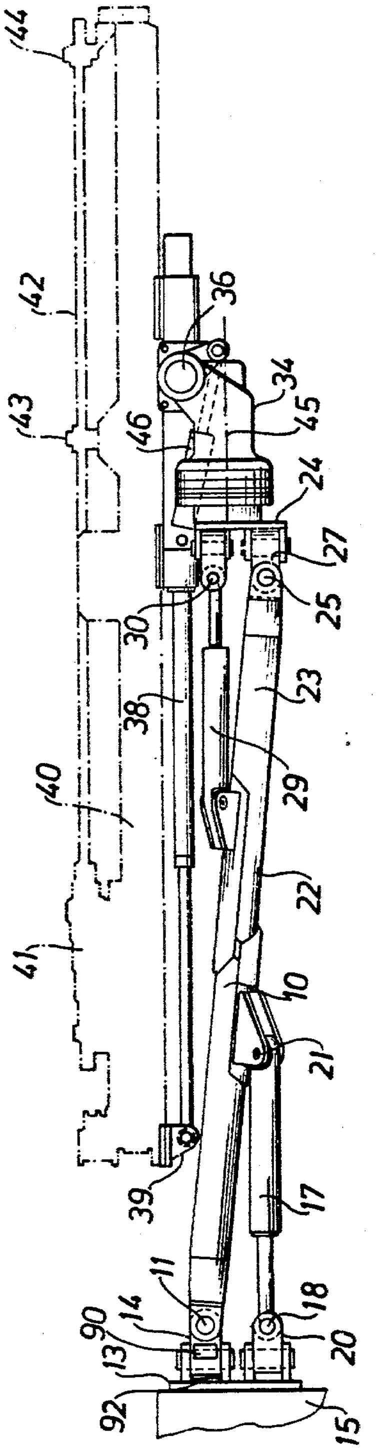
FIGS. 7 and 8 are views corresponding to FIGS. 1 and 2 but showing a somewhat modified embodiment.
Figure 8:
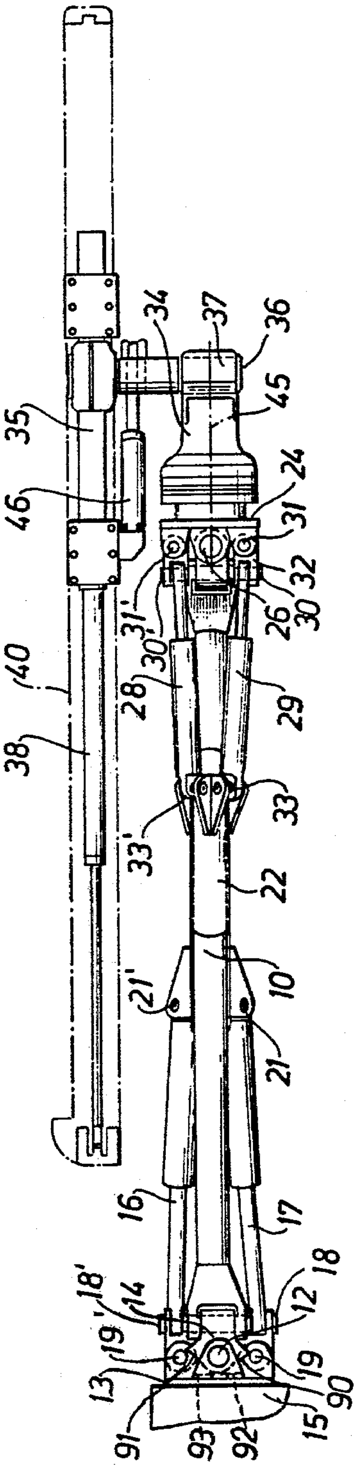

In FIGS. 7 and 8, elements corresponding to elements in the preceding figures have been given the same numerals as in the preceding figures. In the modified embodiment shown in FIGS. 7 and 8, the cylinders 16, 17, and 28, 29 have been turned so that the cylinders are coupled to the four joints 21, 21[1], 33, 33[1] and the piston rods of the cylinders are coupled to the four horizontal cross shafts 18 and 32. This mounting permits a wider angle of swinging of the boom 10 although the support plate 13 is not bigger. The link 14 has two lugs 90, 91 that will engage two stops 92, 93 on the support plate 13 to limit the horizontal swinging movement of the boom so that the piston rods of the cylinders 16, 17 cannot be forced against the boom 10 and destroyed.

The two shown embodiments are only illustrative of the invention. As examples of possible amendments can be mentioned that all joints associated with the boom and the cylinders can be constructed as ball joints.

I claim:

1. A drill boom arrangement comprising a boom support (13), a boom (10) pivotally mounted at one end of said boom support, a feed beam (40) for a rock drill (41) pivotably mounted on the distal end of the boom, a first hydraulic cylinder (17) for pivoting the boom relative to the boom support, a second hydraulic cylinder (28) for pivoting the feed beam relative to the boom, a hydraulic circuit coupling said first and second cylinders in series, said circuit including a direction valve (58) connected to supply and to drain and operable to actuate said first and second cylinders to swing the boom and the feed beam simultaneously in opposite directions, and valve means (51) to lock said first cylinder in its position when not actuated through said direction valve, characterized by a valve (73) for short-circuiting said first cylinder (17) to permit operation of said second cylinder (28) by means of said direction valve (58) while said first cylinder remains in its position.

2. A drill boom arrangement according to claim 1 further comprising a means (76) for reversing the flow to said second cylinder (28) when said first cylinder (17) is short-circuited.

3. A drill boom arrangement according to claim 2, further comprising a common actuator (77, 74) for simultaneously actuating said short-circuiting valve (73) to short-circuit said first cylinder (17) and said reversing means (76) to reverse the flow to said second cylinder (28).

4. A drill boom arrangement according to claim 1 in which said boom (10) is mounted on said boom support (13) to be swingable both vertically and horizontally, further comprising a third hydraulic cylinder (16) for pivoting the boom relative to the boom support, a fourth hydraulic cylinder (29) for pivoting the feed, beam (40) relative to the boom, a second hydraulic circuit coupling said third and fourth cylinders in series, said second circuit including a second direction valve (57) connected to supply and to drain and operable to actuate said third and fourth cylinders to swing the boom and the feed beam simultaneously in opposite directions, valve means (50) to lock said third cylinder in its position when not actuated through said second direction valve, and a second valve (72) for short-circuiting said third cylinder (16) to permit operation of said fourth cylinder (29) by means of said second direction valve (57) while said third cylinder remains in its position.

5. A drill boom arrangement according to claim 4 further comprising a means (75) for reversing the flow to said fourth cylinder (29) when said third cylinder (16) is short-circuited.

6. A drill boom arrangement according to claim 5 in which said common actuator (77, 74) is arranged to simultaneously actuate said two short-circuiting valves (72, 73) to short-circuit said first and third cylinder (16, 17) and said two reversing means (75, 76) to reverse the flow to said second and fourth cylinders (28, 29).

7. A drill boom arrangement according to claim 4 in which a manually one-hand controlled actuator (59) is coupled to both said direction valves (57, 58) to make possible a simultaneous actuation thereof.

8. A drill boom arrangement according to claim 6 in which said manually one-hand controlled actuator is coupled to control pilot valves (60–63) which are coupled through control lines to said direction valves (57, 58) to control the direction valves, said means for reversing the flow to said second and third cylinders being valves (75, 76) operable to cross-connect the control lines of each direction valve (57, 58).

9. A drill boom arrangement according to claim 4 in which said first and third cylinders (16, 17) are coupled between the boom support (13) and the boom (10) to form a tripod arrangement together with the boom.

10. A drill boom arrangement according to claim 9 in which said first and third cylinders (16, 17) are located on each side of a vertical plane through the boom so that each of the first and third cylinders (16, 17) effects swinging both laterally and vertically when actuated.

* * * * *

UNITED STATES PATENT AND TRADEMARK OFFICE

CERTIFICATE OF CORRECTION

PATENT NO. : 4,266,749

DATED : May 12, 1981

INVENTOR(S) : Axel L. Lundstrom

It is certified that error appears in the above—identified patent and that said Letters Patent is hereby corrected as shown below:

In the drawings delete Figuresz 7 and 8 and substitute the attached Figures therefor.

Signed and Sealed this

Seventeenth Day of November 1981

[SEAL]

Attest:

GERALD J. MOSSINGHOFF

*Attesting Officer* *Commissioner of Patents and Trademarks*

UNITED STATES PATENT AND TRADEMARK OFFICE

CERTIFICATE OF CORRECTION

PATENT NO. : 4,266,749

DATED : May 12, 1981

INVENTOR(S) : Axel L. LUNDSTROM

It is certified that error appears in the above—identified patent and that said Letters Patent is hereby corrected as shown below:

Fig.7

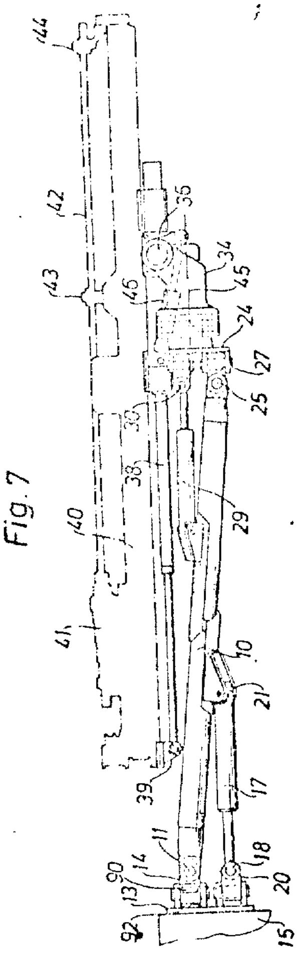

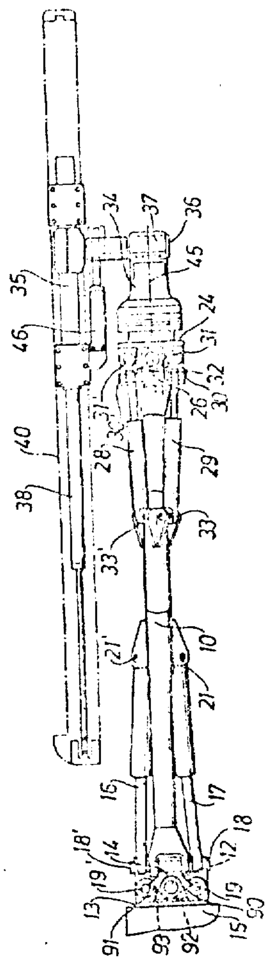

Fig.8